United States Patent
Bowne et al.

(10) Patent No.: US 10,366,299 B2
(45) Date of Patent: Jul. 30, 2019

(54) SORTING/SCANNING SYSTEM CAMERA UPGRADE APPARATUS WITH BACKWARDS COMPATIBILITY

(71) Applicant: BULL HN INFORMATION SYSTEMS, INC., Billerica, MA (US)

(72) Inventors: David Lowell Bowne, La Crosse, WI (US); Shahrom Kiani, Onalaska, WI (US); Carlos Macia, La Crescent, WI (US); Russell W. Guenthner, Glendale, AZ (US)

(73) Assignee: BULL HN INFORMATION SYSTEMS, INC., Billerica, MA (US)

(*) Notice: Subject to any disclaimer, the term of this patent is extended or adjusted under 35 U.S.C. 154(b) by 301 days.

(21) Appl. No.: 13/650,413

(22) Filed: Oct. 12, 2012

(65) Prior Publication Data

US 2014/0105452 A1    Apr. 17, 2014
US 2019/0171901 A9    Jun. 6, 2019

Related U.S. Application Data

(60) Provisional application No. 61/551,174, filed on Oct. 25, 2011.

(51) Int. Cl.
     *G06K 9/00*          (2006.01)
     *G06K 9/36*          (2006.01)

(52) U.S. Cl.
     CPC ........... *G06K 9/36* (2013.01); *G06K 9/00973* (2013.01); *G06K 2209/01* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,841,375 A | * | 6/1989 | Nakajima | G06K 15/00 358/442 |
| 5,103,489 A | * | 4/1992 | Miette | B07C 3/14 382/101 |
| 5,113,369 A | * | 5/1992 | Kinoshita | G06F 13/4018 710/307 |
| 5,528,740 A | * | 6/1996 | Hill | G06T 3/4023 345/428 |
| 5,841,552 A | * | 11/1998 | Atobe | G06K 15/02 358/447 |
| 5,862,257 A | * | 1/1999 | Sekine | G06T 1/00 358/3.01 |
| 5,949,551 A | * | 9/1999 | Miller | H04N 1/00127 348/211.3 |

(Continued)

*Primary Examiner* — Avinash Yentrapati
(74) *Attorney, Agent, or Firm* — Pillsbury Winthrop Shaw Pittman LLP (57) ABSTRACT

A scanning camera upgrade adaptor system provides backwards compatibility when an existing scanning camera subsystem is replaced or upgraded in automated sorting equipment with a newer camera having a different data format. The adaptor system allows sorting equipment such as mail sorting equipment to be upgraded or repaired with a new camera while providing compatibility and optional fallback to a previous mode of operation of the existing equipment. The upgrade system enables legacy equipment and newly added sorting/processing equipment to be utilized in conjunction, while reducing cost of upgrade and necessity for completely new equipment as desirable features are added.

24 Claims, 7 Drawing Sheets

(56) References Cited

U.S. PATENT DOCUMENTS

| | | | | |
|---|---|---|---|---|
| 5,982,363 | A | * | 11/1999 | Naiff .................. H04N 5/38 348/E5.002 |
| 6,069,664 | A | * | 5/2000 | Zhu .................. H04N 7/0112 348/441 |
| 6,111,893 | A | * | 8/2000 | Volftsun .................. H04Q 3/62 370/466 |
| 6,222,613 | B1 | * | 4/2001 | Haraguchi .............. H04N 1/40 355/40 |
| 6,289,137 | B1 | * | 9/2001 | Sugiyama .............. G06T 5/009 358/451 |
| 6,333,792 | B1 | * | 12/2001 | Kimura .................. G06T 3/40 358/1.1 |
| 6,334,160 | B1 | * | 12/2001 | Emmert .............. G06F 13/385 710/105 |
| 6,404,775 | B1 | * | 6/2002 | Leslie .............. H04B 7/15528 370/315 |
| 6,449,398 | B1 | * | 9/2002 | Gennetten .............. H04N 1/387 382/283 |
| 6,496,122 | B2 | * | 12/2002 | Sampsell .............. H03J 1/0025 340/12.28 |
| 6,529,556 | B1 | * | 3/2003 | Perdue .................. G08C 15/06 341/176 |
| 6,549,918 | B1 | * | 4/2003 | Probert, Jr. .............. G06F 16/258 |
| 6,611,607 | B1 | * | 8/2003 | Davis .................. G06F 21/10 382/100 |
| 6,683,967 | B1 | * | 1/2004 | Takahashi .......... G06K 9/00442 382/101 |
| 7,394,915 | B2 | * | 7/2008 | Braun .................. G01B 11/026 382/101 |
| 7,397,009 | B2 | * | 7/2008 | O'Donohue .............. B07C 3/14 209/584 |
| 7,420,560 | B2 | * | 9/2008 | Suen .................. G06F 3/147 345/428 |
| 8,514,285 | B2 | * | 8/2013 | Yoshizumi .............. G03B 37/04 348/143 |
| 8,625,663 | B2 | * | 1/2014 | Sayre .................. H04N 7/17318 345/591 |
| 2001/0022848 | A1 | * | 9/2001 | Rhoads .............. G06K 9/00442 382/100 |
| 2002/0101520 | A1 | * | 8/2002 | Milam .................. H04N 5/2251 348/231.6 |
| 2003/0061325 | A1 | * | 3/2003 | Monroe .......... G08B 13/19656 709/223 |
| 2003/0138129 | A1 | * | 7/2003 | Olson .................. B07C 3/08 382/101 |
| 2003/0177500 | A1 | * | 9/2003 | Nakamura .............. H04N 7/18 725/105 |
| 2003/0182017 | A1 | * | 9/2003 | O'Donohue .............. B07C 3/00 700/224 |
| 2003/0185302 | A1 | * | 10/2003 | Abrams, Jr. .......... H04N 5/232 375/240.12 |
| 2003/0217294 | A1 | * | 11/2003 | Kyle .................. G06K 9/00221 713/186 |
| 2004/0218783 | A1 | * | 11/2004 | Mampe .................. B07C 3/14 382/101 |
| 2004/0244059 | A1 | * | 12/2004 | Coman .................. H04N 5/40 725/139 |
| 2005/0135790 | A1 | * | 6/2005 | Hutten .............. H04N 1/33315 386/232 |
| 2006/0056716 | A1 | * | 3/2006 | Komeno .............. H04N 5/44504 382/233 |
| 2006/0115110 | A1 | * | 6/2006 | Rodriguez .............. B41M 3/10 382/100 |
| 2007/0003102 | A1 | * | 1/2007 | Fujii .................. G06T 1/0071 382/100 |
| 2007/0062403 | A1 | * | 3/2007 | Braun .................. G01B 11/026 101/484 |
| 2008/0137907 | A1 | * | 6/2008 | Berlin .................. B07C 3/14 382/101 |
| 2008/0183329 | A1 | * | 7/2008 | Gilham .............. G07B 17/00467 700/224 |
| 2008/0198925 | A1 | * | 8/2008 | Sayre .................. H04N 7/17318 375/240.01 |
| 2009/0034782 | A1 | * | 2/2009 | Gering .............. G06K 9/00624 382/100 |
| 2009/0097698 | A1 | * | 4/2009 | Kasahara .............. G06F 21/608 382/100 |
| 2010/0091337 | A1 | * | 4/2010 | Yoshio .................. H04N 1/44 358/3.28 |
| 2011/0187819 | A1 | * | 8/2011 | Katz .................. H04N 13/139 348/43 |
| 2013/0076966 | A1 | * | 3/2013 | Border .................. H04N 5/2254 348/345 |
| 2014/0037165 | A1 | * | 2/2014 | King .................. A61B 5/748 382/128 |
| 2014/0105452 | A1 | * | 4/2014 | Bowne .............. G06K 9/00973 382/101 |
| 2014/0369550 | A1 | * | 12/2014 | Davis .................. G06Q 30/0201 382/100 |

\* cited by examiner

FIG. 7

SORTING/SCANNING SYSTEM CAMERA UPGRADE APPARATUS WITH BACKWARDS COMPATIBILITY

CROSS REFERENCE TO RELATED APPLICATIONS

REFERENCE TO U.S. PROVISIONAL PATENT APPLICATION 61/551,174 Filed Oct. 25, 2011

STATEMENT REGARDING FEDERALLY SPONSORED RESEARCH OR DEVELOPMENT

NONE

THE NAMES OF PARTIES TO A JOINT RESEARCH AGREEMENT

NONE

INCORPORATION-BY-REFERENCE OF MATERIAL SUBMITTED ON A COMPACT DISC

NONE

This application claims priority to a U.S. Provisional Patent Application 61/551,174 Filed Oct. 25, 2011 titled "SORTING/SCANNING SYSTEM CAMERA UPGRADE APPARATUS WITH BACKWARDS COMPATIBILITY" with first named inventor David Lowell Bowne, La Crosse, Wis. (US), which is expressly incorporated herein as though set forth in full.

BACKGROUND OF THE INVENTION

The present invention relates generally to mail processing, and more particularly to a method, system and program product for providing backwards compatibility when replacing a camera subsystem with a newer camera subsystem in standard automated mail sorting equipment such as a Multi-Line Optical Character Recognition (MLOCR) mail sorter.

As automated mail sorting equipment ages the need to replace key components that may have become obsolete or reached the end of their useful life becomes a potential issue. One such component is the camera subsystem that is used to scan images of mail items. A camera subsystem typically connects to various other components of the mail sorting equipment such as the tachometer, the system control computer and the image processing subsystem etc. Replacing a camera subsystem, or just the camera with an equivalent model may not be possible or may be very expensive, because an equivalent subsystem, or an exact replacement model camera may not be available. In any sorting system utilizing a camera, the camera is a key component of the system and may serve as the basis for all sorting by the machine, with the camera utilized in performing address recognition, bar code recognition, or other processing based upon an image of the item to be sorted as "seen" through the lens of the camera, and then captured in digital form for digital processing.

BRIEF SUMMARY OF THE INVENTION

Directly replacing an obsolete, aging, or broken camera subsystem in sorting equipment with a new camera subsystem may not be possible, or may become a costly proposition because of lack of compatibility of new camera components with the rest of the components that are already in place in the sorting equipment. Newly available cameras may typically provide higher resolution images than older cameras, and may also present data in a different analog or digital format, or utilize different physical connectors, or use electrical signals in a different way, at different voltage or current levels, or may differ in many ways that would be well known or understandable to one familiar or skilled in the art of electronics and/or video cameras.

The present invention in several illustrated embodiments is directed towards replacing a "legacy" (original equipment) camera subsystem with a new camera or camera subsystem, and adapting the new camera to work in the legacy (old) environment.

Such replacement when utilizing a new higher resolution camera with possibly better optics or lighting or other improvements may for example further provide for better images, improved recognition of addresses or bar codes, improved speed of processing, or other similar and general improvements.

It is therefore an advantage to provide a method and/or apparatus that allows for replacing a camera subsystem of standard sorting equipment, such as mail sorting equipment with newer camera technology, or a different model camera while continuing to allow for and to provide specifically for utilization of significant portions or even all of the older equipment and subsystems within the sorting system. Installation of a new camera may further enable improving the performance, and/or adding features and other equipment to the original sorting system.

For example, a higher resolution camera may provide for improved recognition of written, encoded, or printed addresses, or allow for use of better or alternative algorithms for recognizing written, encoded, or printed addresses on a mail item being sorted.

Introduction of a new technology into a complex system such as mail sorting equipment may present a risk of impacting the current (legacy) operation and/or algorithms of the equipment. Accordingly, a further advantage of the method and apparatus of the present invention is minimizing the impact of introducing such new camera technology into such sorting equipment, and for allowing for fallback utilizing legacy pieces of an existing piece of sorting equipment in the event of failure or incorrect operation of new equipment installed in the sorting system beyond that of the camera itself.

The current or prior art mode of operation includes processing images of mail items captured with a legacy camera at an existing resolution, 212 dots per inch (dpi) (for example). These will be referred to as "legacy images" and are handled by the same legacy components that already exist in the standard mail sorting equipment.

In the same context, the new mode of operation includes processing images of mail items captured with a new camera, typically at a higher resolution, 256 dpi or higher, for example, and also allowing for a new camera with the same resolution as the old, but with possibly a different format for output of scan or video data. These will be referred to as "high resolution images" and are handled by a new set or group of components that are added to the standard mail sorting equipment. It will be appreciated that both modes of operation utilized by such mail sorting equipment share the same goal: processing images of mail items to automatically read the mailing address and sort the items accordingly. The new mode of operation provides higher performance by taking advantage of higher resolution images and a new set of components that provide additional functionality such as multiple binarization algorithms, more accurate region of interest detectors, etc.

Accordingly, the method and/or apparatus the present invention fulfills the need for minimizing the impact of replacing legacy camera technology with newer technology achieved by providing backwards compatibility with existing equipment and system programming. In addition, further illustrated embodiments of the method and/or apparatus may also provide for improved performance in operation of a sorting machine while allowing for reduction in cost of an upgrade by utilizing existing components.

Additionally, the method and apparatus of the present invention allows standard mail sorting equipment to fall or revert back to its previous mode of operation in the event of a failure in the newer camera subsystem during operation. That is, where newer features or equipment were added during a camera or camera subsystem upgrade, these features and/or operation of the new equipment could be disabled in case of problems, thus allowing the sorting equipment to revert to a prior mode of operation while still utilizing the new camera or camera subsystem, this prior mode possibly affording better reliability, testing, or compatibility with prior operation and/or other equipment. The method and apparatus of the invention described herein according to one illustrated embodiment relies on the addition of a new camera system including or being connected to an adaptor card apparatus in a manner wherein the new camera system provides as outputs both "legacy images" and "high resolution images". As described herein, the adaptor card apparatus of the illustrated embodiment may be implemented as a printed circuit board (PCB) having one (1) input connection such as CamLink or Gigabit Ethernet connected to a new high resolution camera and two (2) output connections, one connected to the new components of the mail sorting equipment in the form of a pass-through connection such as CamLink or Gigabit Ethernet carrying "high resolution images" and a second output connection to the legacy components of the mail sorting equipment, and utilizing the same format and optionally the connection mechanism as previously utilized. In at least one embodiment, the output connection may take the form of a connection such as Low-voltage Differential Signaling (LVDS) used for carrying "legacy images". The adaptor card apparatus of the illustrated embodiment, utilizing dual image data paths, is able to provide backwards compatibility with the legacy components as well as optional connection to the newer components or equipment while providing a fall back mechanism in the event of a failure occurring in the new components.

In addition, a further illustrated embodiment of the method and apparatus of the present invention described herein also includes a mechanism or arrangement for synchronizing and pairing a "legacy image" with its "high resolution image" counterpart when both images are received by the new components during the new mode of operation. A "legacy image" may carry important information, such as the mail item identification tag or (i.e. a unique tag that automated mail sorting equipment creates to track each mail item during processing), which can only be provided by the legacy image processing subsystem components. Therefore, this information is not readily available to its "high resolution image" counterpart since this high resolution image bypasses the standard processing step performed by the legacy components. Images processed by the "legacy" equipment and programming may not produce the same number of output "files" or data and/or the data may come out of the legacy system equipment and the legacy program process may occur in a different order than which it went in. Therefore, there is need for the new components to provide a mechanism or arrangement for synchronizing or associating these image pairs in order to obtain the potentially very much needed information from the "legacy image". The synchronization and pairing method and mechanism of this further illustrated embodiment thus provides backwards compatibility with the legacy components since information such as the mail item identification tag may be essential in completing the sorting of a mail item, and this capability may not be provided by the new camera subsystem in equivalent form or in the same sequence.

The synchronization method which pairs a legacy image with its high resolution image is included in the further illustrated embodiment for those situations where capture, processing, and storage of the legacy image may occur independently of the capture, processing, and storage of the high resolution image. For example, mail items scanned by the legacy system may not result in production of a legacy images for every mail item, and legacy images may not be produced in the same order as the mail items are scanned. Thus, this further illustrated embodiment of the method and apparatus of the present invention provides an alternative mechanism for relating or associating each legacy image with a high resolution image.

As discussed above and in greater detail herein, according to one or more illustrated embodiments of the method and apparatus of the present invention, automated mail sorting equipment is able to be upgraded with a new camera subsystem that includes a new camera and an adaptor card apparatus. According to the teachings of the present invention, as part of this upgrade, automated mail sorting equipment is also outfitted with a new set of components that include new image processing subsystem components to take advantage of the features provided by the new camera subsystem, such as higher resolution images. During the upgrade, the input port of the adaptor card is connected to the new camera via an interface connection such as CamLink or Gigabit Ethernet. One of the output ports of the adaptor card is connected to the legacy image processing subsystem components via an interface such as LVDS. The second output port of the adaptor card apparatus is also connected to the new image processing subsystem components via an interface connection such as CamLink or Gigabit Ethernet. In this configuration of the illustrated embodiment, the adaptor card apparatus receives "high resolution images" from the new camera subsystem and transmits these "high resolution images" to the new image processing subsystem components. In parallel, the adaptor card apparatus "down-samples" (converts) the "high resolution images" received from the new camera subsystem to a resolution that matches the image resolution of the legacy camera subsystem being replaced, thus converting them into "legacy images", and transmits those "legacy images" to the legacy image processing subsystem components. The adaptor card apparatus receives a single high resolution image data stream from the new camera subsystem and generates two image data streams from it, a low resolution stream thereby maintaining compatibility with the legacy components and a high resolution stream to support the operation of the new components.

During operation before a "legacy image" is sent to the legacy components, the adaptor card apparatus of the illustrated embodiment encodes a unique image identification number into a digital signature, such as a barcode format such as a 2-state, 4-state or any other linear or two dimensional barcode symbology and superimposes the digital signature on an area of the "legacy image", such as the lower right corner, the right edge or a combination thereof, that is likely to minimize obstructing or overwriting important mail item information. In the case of a linear barcode, such barcode can be superimposed vertically (in a "ladder-like" fashion), horizontally (in a "picket fence-like" fashion) or both. The selected digital signature is designed to optimize its chances of surviving the image processing operations such as binarization or cropping that are typically performed by the legacy image processing subsystem components. For example, if the bars of a barcode are designed too thin or too short they may get interpreted as background noise and removed during the image binarization operation (i.e. when an image is converted from color or gray-scale to black and white). The reason for including both a vertical and a horizontal copy of a linear barcode is to minimize the chances of the legacy image processing subsystem components obliterating or partially removing the barcode.

Likewise, before a "high resolution image" is sent to the new components, the adaptor card apparatus encodes into the first few bytes of the "high resolution image", using an alphanumeric character representation system such as American Standard Code for Information Interchange (ASCII), the same unique image identification number that was used to encode the digital signature of its "legacy image" counterpart. Since a "high resolution image" is not processed by the legacy image processing subsystem components there is no danger of the legacy binarization task or operation removing the alphanumeric characters. In this case, the new image processing subsystem components are designed or implemented to recognize "high resolution images" and extract the unique image identification number from the images before they are converted from color or gray-scale to black and white. It will be recognized by those skilled in the art that other methods for encoding and extracting a unique image identification number could be devised.

From the above, it is seen that the upgraded automated mail sorting equipment is thus able to operate in two modes. One mode, referred as the "new mode of operation", takes full advantage of the new camera subsystem as well as the new set or group of components added to the standard mail sorting system to process the images and sort the mail items. The other mode, referred as the "fallback mode of operation", or "legacy operation", incorporates and utilizes the new camera subsystem, but still utilizes or relies on "original" legacy components to process the images and sort the mail items.

Under and during the "new mode of operation", the new camera subsystem of the illustrated embodiment transmits "legacy images" to the legacy image processing subsystem components for processing and "high resolution images" to the new image processing subsystem components for processing. The tasks performed by the legacy components may include a binarization step to convert the image from color or gray-scale to black and white. When the automated mail sorting equipment is operating in this mode, the new set of components receive from the legacy components the "legacy images" including any available important information such as the mail item identification tag. Likewise, the new components also receive directly from the adaptor card apparatus the "high resolution images". A major task or operation/function performed by the new set of components includes processing "legacy images" to locate and read the digital signature that was superimposed on the images by the adaptor card apparatus. The purpose of this digital signature reading task is to decode the unique image identification number associated with each image. Another major task or operation performed by the new set or group of components includes processing "high resolution images" to extract from them the unique image identification number that was encoded in the first few bytes of each image by the adaptor card apparatus. Next, an image pairing task or operation performed by the adapter card apparatus utilizes the information read from the digital signature of "legacy images" and the information extracted from the first few bytes of "high resolution images" to associate or relate pairs of low and high resolution images that correspond to the same sorted physical mail item. Once the image pairs are associated, all the information about the image that was available only to the "legacy images" is also now made available to the "high resolution images". Therefore, the adapter card apparatus is able to associate an important piece of information such as the mail item identification tag with the "high resolution image" and be made known during the subsequent processing of this image. This enables the adapter card apparatus to successfully sort a mail item using the new "high resolution image". Under the "new mode of operation" standard automated mail sorting equipment has the option of utilizing either image (i.e. "legacy" or "high resolution") during the subsequent sorting process.

In a still further illustrated embodiment of the method and apparatus of the present invention, the "fallback mode of operating" is invoked when a failure is detected in any of the new set of components that can prevent the system from using "high resolution images" and the new set of components to successfully sort mail items. In this mode, the mail sorting system reverts back to only utilizing "legacy images" and legacy components to sort mail items. That is, when this happens, the new set of components and the "high resolution images" are not utilized. Instead, the legacy components utilize or rely on the "legacy images" that they receive from the adaptor card to complete or perform the task or operation of sorting mail items. The "legacy images" contain everything that is needed to successfully sort in this mode of operation. There is no need to decode the unique image identification number from the digital signature that was superimposed on "legacy images" by the adaptor card apparatus since it is no longer necessary to pair "legacy images" with "high resolution images". In fact, the only difference between this mode of operating and the legacy mode of operation (i.e. before the upgrade took place) is that the "legacy images" are now being provided by a new camera subsystem that will likely show improved performance from higher quality optics, better illumination, larger field of view, etc. Therefore, even when the upgraded system falls back to a legacy mode of operation, the standard mail sorting equipment still can provide the benefits obtained from utilizing a better camera subsystem.

BRIEF DESCRIPTION OF THE SEVERAL VIEWS OF THE DRAWINGS

The invention is better understood by reading the detailed description of the invention in conjunction with the accompanying drawings.

DETAILED DESCRIPTION OF THE INVENTION

Figure 1:
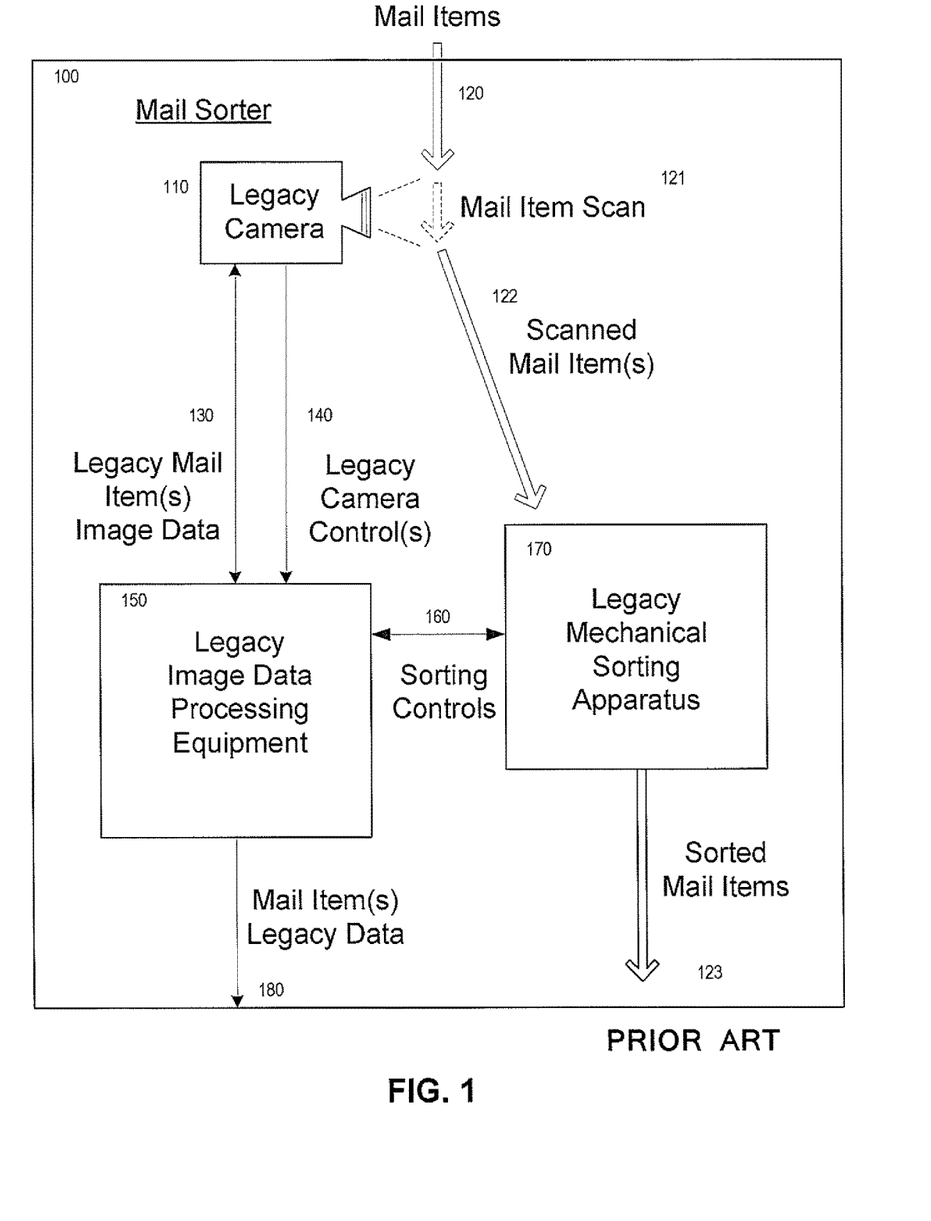
FIG. 1 illustrates typical Mail Sorter Equipment of the prior art.

FIG. 1 illustrates typical mail sorting equipment 100. Mail Items 120 to be scanned for sorting are passed in front of a camera 110 in a step labeled Mail Item Scan 121. The camera provides image data 130 to image data processing equipment 150, the image data processing equipment also optionally serving to utilize the camera with a camera controls interface 140 as necessary to capture images from the camera. The image data processing equipment 150 utilizes the images captured from the camera and sends signals 160 to one or more sorting apparatus 170. Sorted mail items 123 are illustrated as leaving the sorting apparatus, and optional data regarding the mail items and/or the sorting process/results is labeled as Mail Item Legacy Data 180.

Figure 2:
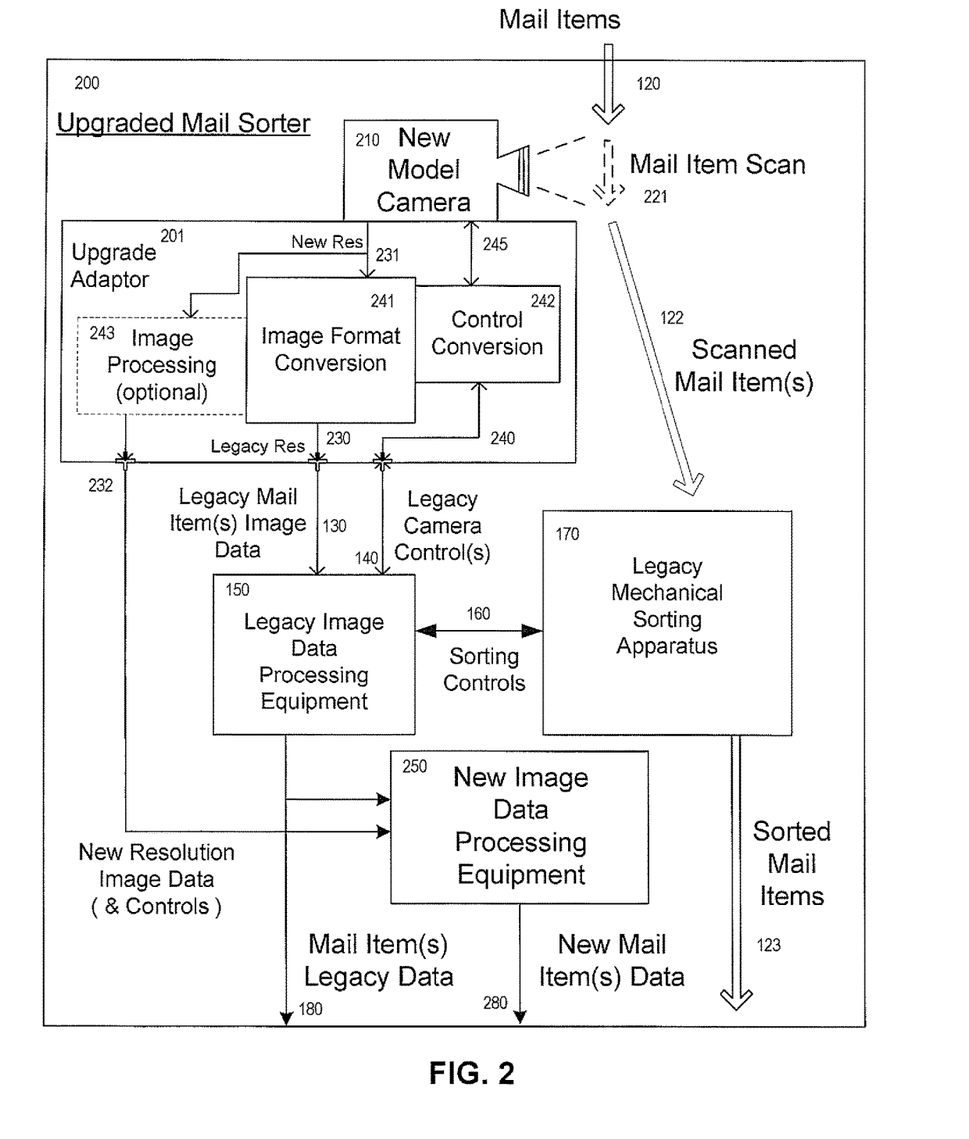
FIG. 2 illustrates Mail Sorting Equipment upgraded utilizing apparatus and/or method according to at least one illustrated embodiment of the present invention.

FIG. 2 illustrates an "upgraded" mail sorter 200 in at least one illustrated embodiment of the present invention. The "legacy" camera 110 of FIG. 1 is replaced with a new model camera 210, which scans mail items or takes pictures of mail items at a higher resolution or with a different output format than the legacy camera. For example, the new model camera takes pictures at a resolution of 256 dots per inch (dpi), or greater, and replaces the legacy camera which took pictures at 212 dpi. The higher resolution may provide for potentially better recognition and processing of addresses written on the mail item and captured during the mail item scan 221. The higher resolution image from the camera 231 may not however be compatible in terms of resolution or signal type or connector styling with the existing (legacy) equipment. Therefore, in order to maintain utilization of other "legacy" components in the sorting machine, it is an advantage of the present invention to provide for hardware and control to provide adapted controls and signals to replace those controls and signals previously associated with the legacy camera. That is, it is an advantage to provide an adaptor apparatus 201 that translates the format and connections of the new model camera 210 to a format and connections compatible with those previously provided 140 by the "old" or legacy camera, and after the update those new signals and controls 240 will replace those previously connected to the legacy camera, but will be in the same format and utilize the same hardware connection 140 as those utilized, before the update, for connection to the "rest" of the sorting machinery.

With further reference to FIG. 2, signals at a higher resolution or alternate format 231 than the original signals from the old or legacy" camera (reference 131 in FIG. 1) are processed by an image format conversions apparatus 241, reduced in resolution to the original "legacy" resolution (if needed), and provided as a signal in the original legacy format (and optionally resolution) 230. Depending on possible differences between the camera being replaced and the new camera, conversion of one or more control signals 242 from "new" controls or new control formats 241 to "legacy controls" or legacy control format 240 may also optionally be provided, or be necessary.

The upgrade adaptor 201 thus provides as output from the image format conversion 241 signals at the legacy resolution and format for connection 130 to the legacy image data processing equipment 150 (already in place). The connection 140 of adapted controls 240 is also provided, if necessary to the legacy image data processing equipment 150. The legacy image data processing equipment 150 then provides sorting controls 160 to the legacy mechanical sorting apparatus 160 which sorts scanned mail items 122 and provides sorted mail items 123.

It also may or may not be advantageous to provide for some processing of the new resolution higher resolution image 231 in parallel with the image format conversion before the image is transmitted as a higher resolution signal 232 to new image data processing equipment 250. New image data processing equipment provides new mail item data 280. In one or more embodiments, new processing of the higher resolution image data is provided for potential improvement in speed or accuracy in development of the sorting controls.

Figure 3:
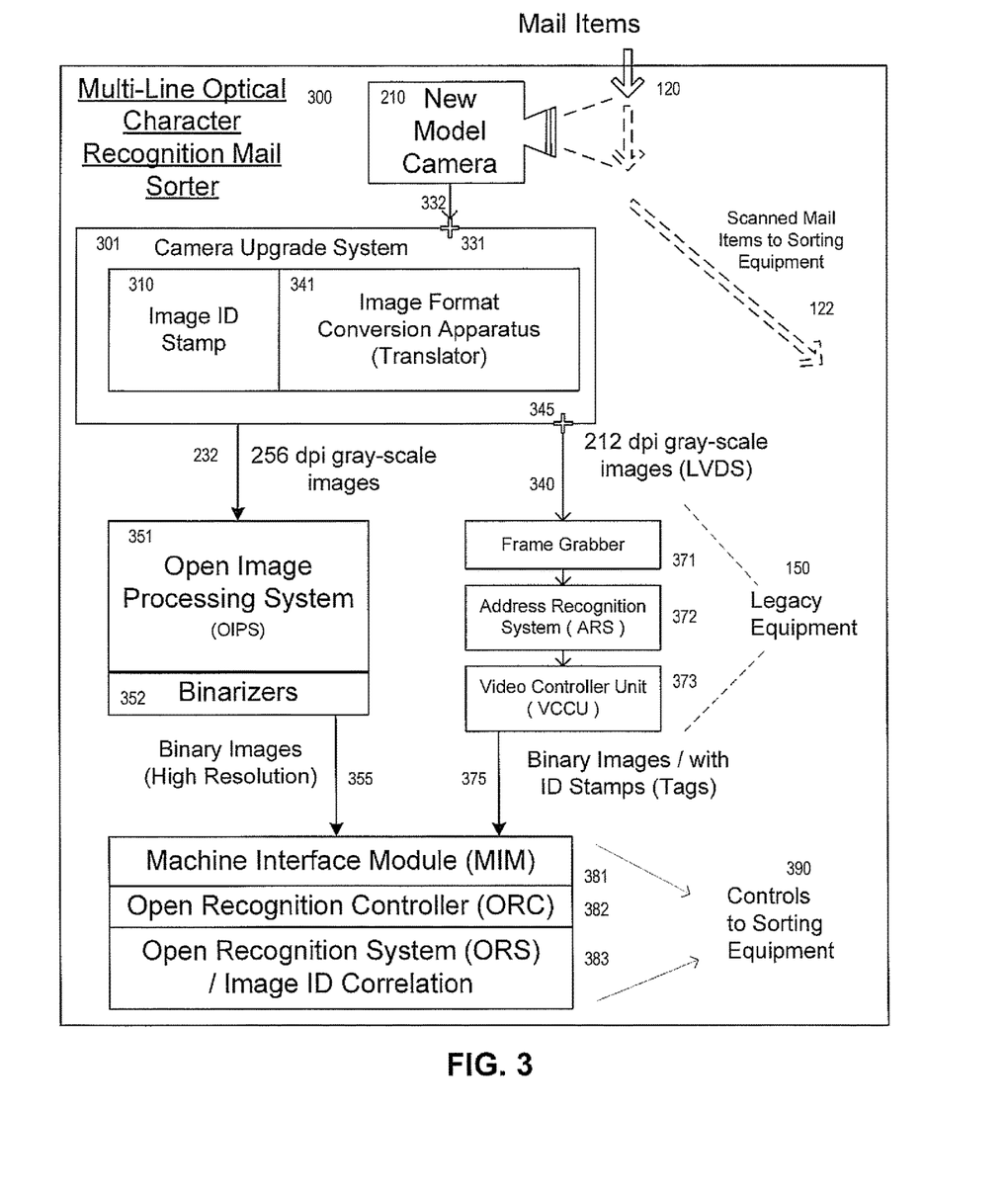
FIG. 3 illustrates upgraded Mail Sorting Equipment according to one or more embodiments including image stamp and image correlation apparatus and/or method for relating legacy images with images at a second resolution.

FIG. 3 illustrates Mail Sorting Equipment that has been upgraded with a new higher resolution camera and which further includes apparatus, controls, and or control programming which creates an image stamp and related image correlation data for tracking and relating a specific legacy (low resolution) image with a high resolution image. This provides a means for relating low resolution "legacy" images with one or more high resolution images of a mail item in order to relate those images after they emerge from two separate paths of processing. This is necessary since images may or may not emerge from processing elements in the order in which they entered, and also because the legacy data processing may not provide any means of identifying specific images in a manner that relates them to an incoming order.

The Machine Interface Module 380/Open Recognition Controller 381/Open Recognition System 382 (MIM/ORC/ORS) box, in general terms, functions so as to receive images and returns sorting results 390 (i.e., where the mail piece should be sorted to). The MIM/ORC/ORS box may optionally support a plurality of mail sorters at a site and typically connects to them over a TCP/IP connection. The MIM/ORC/ORS box provides for connection to both "legacy" Address Recognition System 372/Video Controller Unit (ARS, VCCU) and "new" components (OIPS 351) on each mail sorter.

Figure 4:
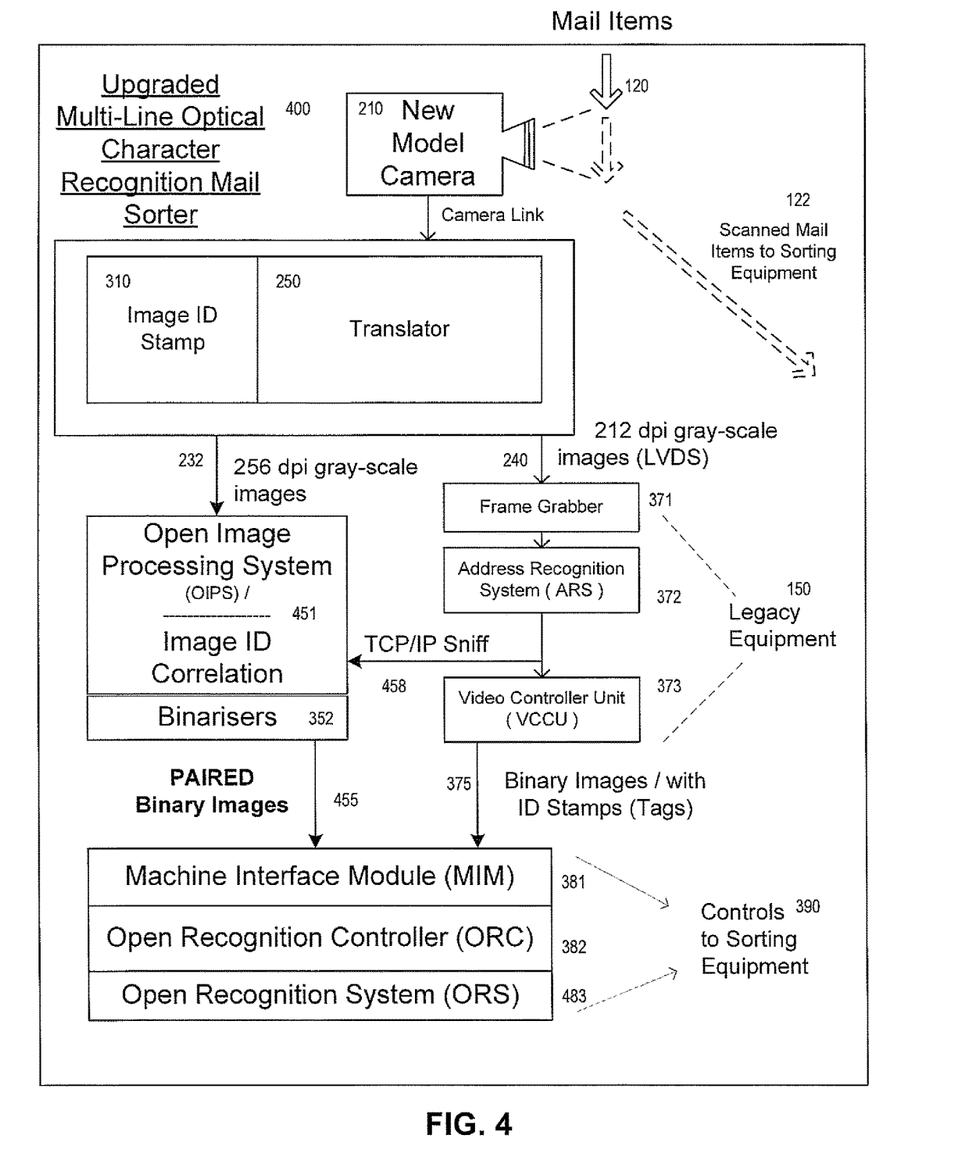
FIG. 4 illustrates an arrangement of upgraded Mail Sorting Equipment according to the present invention including image stamp and image correlation apparatus and/or method for relating legacy images with images at a second resolution, with the pairing of legacy images and images at the second resolution performed in an alternative arrangement/ordering of the system.

FIG. 4 illustrates of an alternative arrangement of components in another illustrated embodiment of the present invention. In FIG. 4 the pairing or correlation (or relating) of legacy images and "new" images (higher resolution images) is done as part of the apparatus and control labeled Open Image Processing System 451, which is somewhat different than the Open Image Processing System 351 of FIG. 3. In the arrangement illustrated in FIG. 4, the legacy images are paired immediately after legacy Address Recognition utilizing the same information normally sent to the Video Controller Unit 373, with the information captured from the TCP/IP connection between the ARS and VCCU with a TCP/IP "sniffer". This allows paired binary images 455 to be sent to the MIM/ORC/ORS 381/382/483 apparatus and controls with the ORS (Open Recognition System) 483 in this arrangement not required to perform the Image ID correlation.

Figure 5:
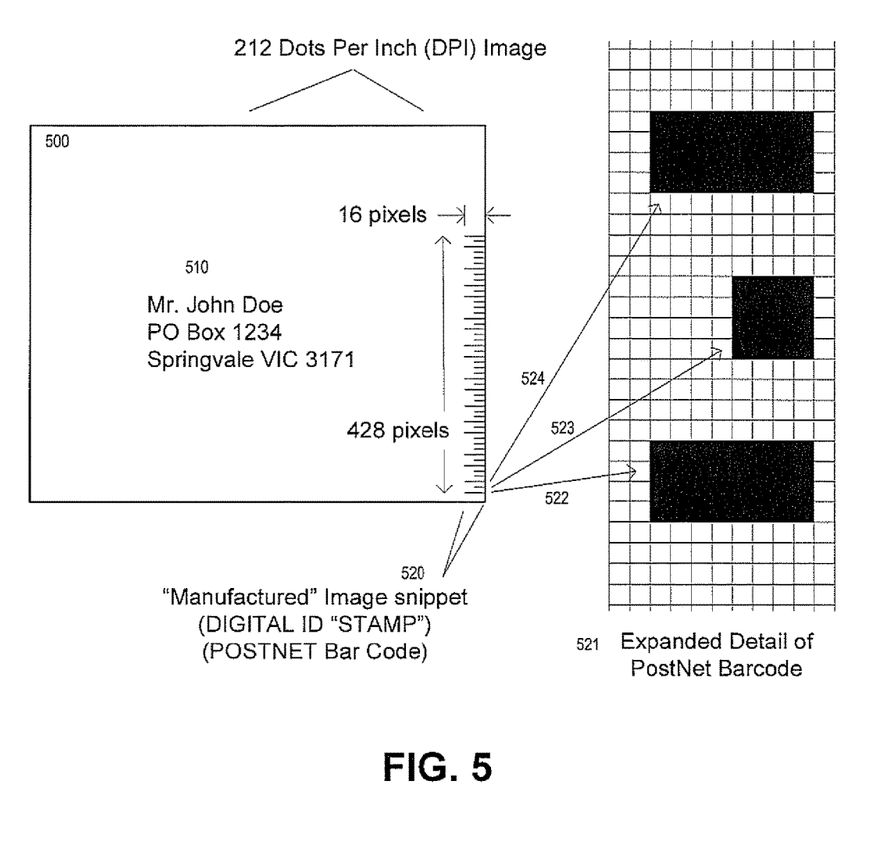
FIG. 5 illustrates the "tagging" or "stamping" of a legacy image illustrated at 212 dpi with a POSTNET Barcode for correlation with a corresponding higher resolution image as illustrated in FIG. 6.

FIG. 5 provides illustration of an exemplary PostNet Barcode 520 and in expanded form 521. This is an exemplary encoding provided as illustration of a stamped image placed at a location on the "legacy" image of a mail item, that is, added to the legacy image in an unobtrusive or non-interfering location. In this example the PostNet Barcode is 428 pixels by 16 pixels 520, and is placed in the lower right corner of the legacy image after capture of the image by the new camera and also after (or during) conversion of the high resolution captured image to the legacy resolution. The individual pixels of an exemplary PostNet Barcode are shown for three of the "bars" 522, 523, and 524 of the BarCode. This barcode is later used to relate the legacy images to the original high resolution images, after the legacy images have proceeded through any legacy processing.

Figure 6:
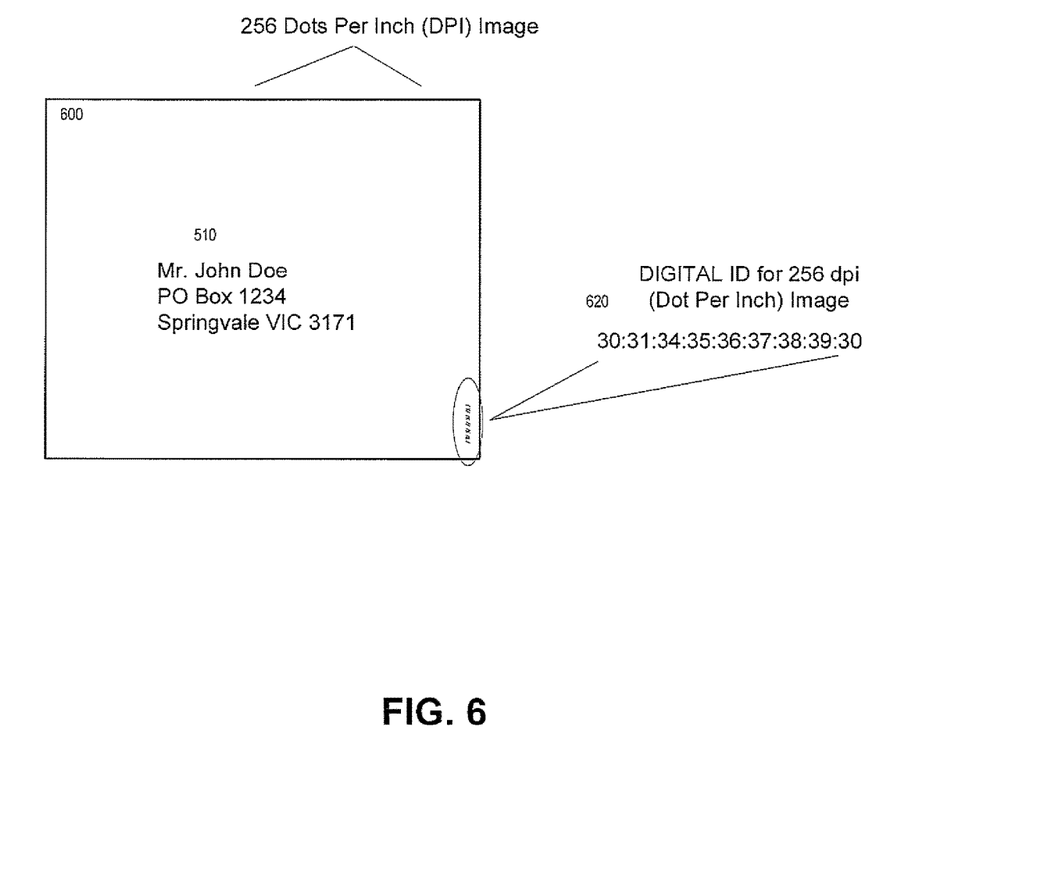
FIG. 6 illustrates a 256 dpi image taken with the new higher resolution camera and marked with an image identification code, for correlation with a corresponding lower resolution image as illustrated in FIG. 5 according to the teachings of the present invention; and, FIG. 7 illustrates the relating of legacy images to high resolution images utilizing an image id tag that is embedded within a legacy image according to the teachings of the present invention.

FIG. 6 provides illustration of a digital ID 620 added to a high resolution image 600 at an exemplary resolution of 256 dots per inch. The digital id added to the high resolution image provides one exemplary method of identifying a high resolution image and then relating it to a low resolution "legacy" image as illustrated in FIG. 5. The digital ID 620 is illustrated in FIG. 6 as being decoded to a numeric value of "30:31:34:35:36:37:38:39:30". The digital ID is exemplary and other methods of relating or identifying a high resolution image to an identifying number or name could be devised by one skilled in the art of computer programming, or sorting machine design.

Figure 7:
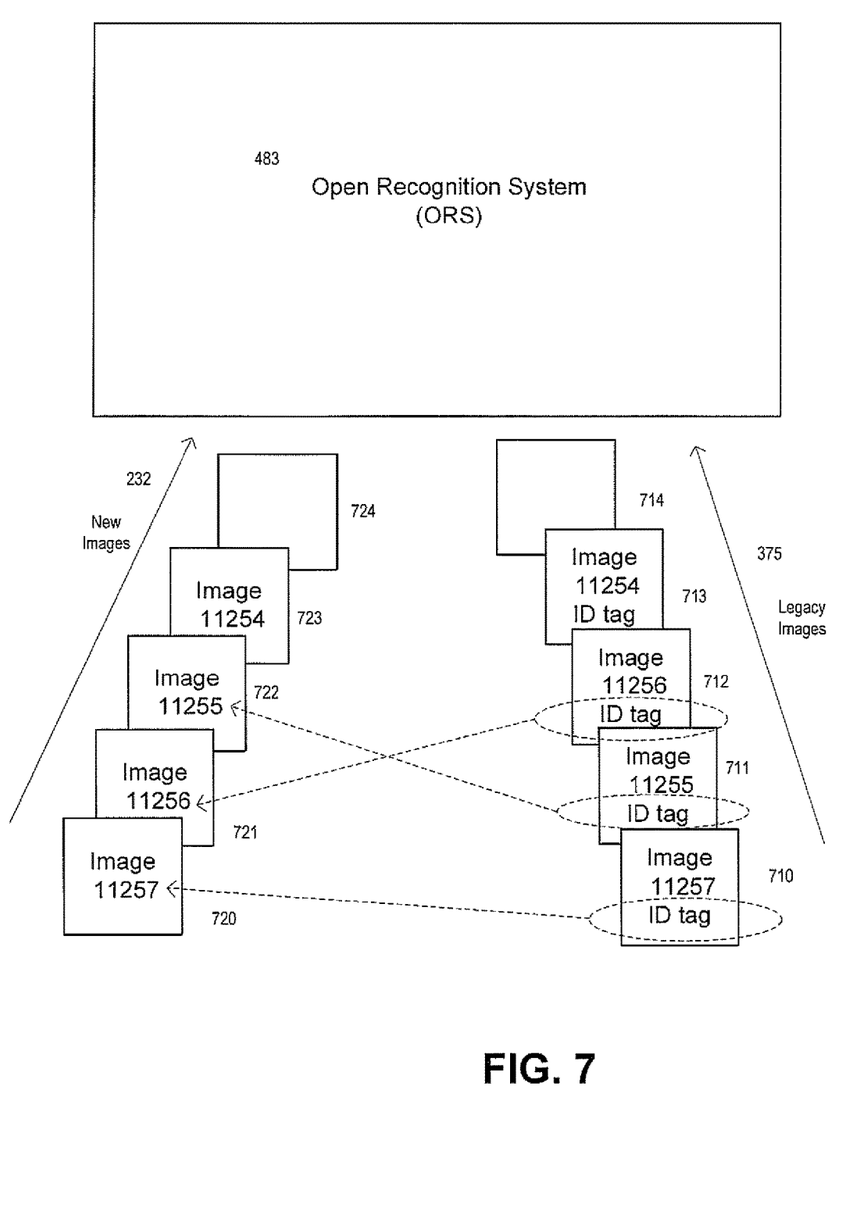

FIG. 7 illustrates, as part of an illustrated embodiment of the present invention, the relating of legacy images to high resolution images utilizing an image id tag that is embedded within a legacy image, with the image id tag being recognized and associated with one or more high resolution images by that tag. A plurality of legacy images 375 is illustrated with several specific legacy images 710, 711, 712, 713, and 714 depicted as being processed by the Open Recognition System (ORS) 483. Each of the legacy images 710-714 has embedded in the image an image id tag, which in this example is a number that can be used to identify and relate from a plurality of high resolution images 232 specific high resolution images 720, 721, 722, 723, and 724 those images associated or related to each specific legacy image.

This illustrated embodiment of the present invention deals with two different ID tags. One set of ID tags could be called "image ID tags" and these are used to pair and synchronize the images. The other ID tag could be referred to as a "mail ID tag" and this tag is created by the legacy data processing equipment and is used to uniquely identify a mail piece. For example, an "image ID tag" of 014567890 allows us to associate a legacy image to multiple new images and all those images would essentially represent scans of "mail ID tag" 1230000012. The only way for a new image to obtain this "mail ID tag" is to get it from its legacy image counterpart (it is part of the legacy image data packet).

In this example, legacy image 710 is found to be associated with high resolution image 720. The high resolution images 720-724 are depicted as "entering" the Open Recognition System in a different order than the legacy images 710-714. The Open Recognition System uses the ID tag to find the relation between new images (high resolution) and legacy images by finding those with the same ID tag. That is, when the legacy images are "stamped" with an embedded ID tag, the new images are tagged in the same way so that the new image in some way identifies itself as being associated with the ID tag. This can be, for example, by a file naming convention, by utilizing a database that associates information with each high resolution file or other ways that might be readily determined by one skilled in the art of computer programming or sorting system design.

Because of the new components with higher resolution image, and optionally better binarization, and algorithms, the MIM/ORC/ORS is able to derive more and more accurate sorting results while still providing for usability within existing mail sorting equipment, and providing for potentially much lower cost in upgrading a system by allowing legacy components to continue to be utilized.

The new camera system typically may further provide better illumination (LED versus halogen) generating cleaner images as well as higher resolution images.

The OIPS not only benefits from receiving higher resolution images from the camera, but it also generates multiple and better binarized images. The legacy components (ARS), on the other hand, typically had only one binarizer and had trouble processing certain types of images (because it would run out of time).

Therefore, the MIM/ORC/ORS box, after the upgrade, will receive cleaner and better binarized images from the OIPS. The MIM/ORC/ORS may also still receive legacy images and has the option of using those if needed.

In an illustrated embodiment of the present invention the approach provides for leveraging all existing technology and allowing for introduction of a new camera and processing components in a parallel flow of higher resolution images, captured with the new camera using better illumination and binarized with updated state-of-the-art binarization engines.

In at least one embodiment, a new camera interfaces to a translator device that receives a Camera Link® 256 DPI gray-scale video stream input from the new camera and passes this native input through to an Open Image Processing System (OIPS). At the same time, the translator also down-samples and normalizes the received input feeding a 212 DPI gray-scale video stream to the existing LVDS Frame Grabber maintaining the current data rates.

The translator functions in a dual role. It receives a Camera Link® input from the new camera and passes through this native input to the OIPS computer. In addition, it translates the Camera Link® input to the legacy LVDS input required by the existing (legacy) frame grabber, while maintaining current image resolution (212 DPI) and data rates. Since the Translator is feeding two versions of the same gray-scale image received from the Camera to two different systems, these images must be properly tagged so that they can be associated and synchronized. It is important to highlight in this illustrated embodiment that the translator uniquely stamps every image before it is fed to the "legacy" Frame Grabber and to the "new" OIPS. This technique allows the Open Recognition System (ORS) to correlate the binarized images after they are received on its end. This correlation provides for association of one or more high-resolution images with the ID Tag that is assigned to the low-resolution image. Once the legacy and new images have been correlated and the ID tags from the legacy images have been associated with the new images, the legacy images may be discarded by the ORS. Alternatively, legacy binary images can be used in a waterfall model if it is found that they contribute to the improvement of the overall recognition rate.

The translator adds a manufactured 16 scan (pixels) wide image snippet to the beginning of every gray-scale image after it is down-sampled to 212 dpi. This digital ID will contain 9 digits encoded in a POSTNET or similar barcode. Using for example a POSTNET barcode, the ID consists of 9 digits+1 check digit, or 50 bars+2 frame bars (leading & trailing long bars). The 9-digit ID contains (for example): a 3 digit MLOCR ID, and a 6 digit mail piece identification number. In the exemplary case of a POSTNET barcode, the manufactured image snippet consists of: a bottom border (8 white pixels thick), left and right borders (4 white pixels wide), and, 52 short or long bars and spaces in between, as follows: a short bar—4×4 black pixels, a long bar—4×8 black pixels, and a space—4×8 white pixels.

The Translator board tags new images in the 256 dpi form with a digital ID by encoding a 9-digit ASCII value within the first few bytes of a 256-dpi image. The first two digits will represent the MLOCR ID and the remaining seven digits will uniquely identify the mail piece, as shown in FIG. 6.

In another illustrated embodiment of the present invention, upgrading of the legacy camera with a new camera also enables and provides for adding multiple and improved binarizers as part of the new image processing equipment. The reason for using multiple binarizers or sometimes using multiple instances of the same binarizer with different configuration settings is to take advantage of the overlap in performance that they may provide. For example, some binarizers are better at binarizing Christmas mail (possibly with red or green envelopes for example) than others. Other binarizers are better at binarizing windowed envelopes. In addition, different binarizers crop images differently as well. Some do better with handwritten characters. By having several binarized images of the same mail piece available, a system can try one image first and switch to a different image if the first one did not yield any results. All binarizers inside the new image processing equipment would typically work from the same input high resolution image. The legacy binarizer inside the legacy ARS will only work on the low resolution image, and therefore the introduction of a new high resolution camera in place of a low resolution camera provides for potentially improved sorting by the use of multiple binarizers working on the high resolution image.

The output of a binarizer is always a "binary" image (black and white), but the content of the binary file will vary based on what the algorithm did to the input image. In some cases the binarization effect is even noticeable to the naked eye if one were to display the various versions of the binarized images on a computer monitor. A legacy binarizer may be slow and limited by the CPU performance of the legacy computer it runs on. Because of this, there may be images that only get partially binarized, potentially truncating the address block. Those images will result in mail pieces being rejected by the sorter. The present invention enables adding improvements to the image processing hardware and software by allowing both high and low resolution images by new/legacy equipment (respectively) and in parallel, and also to utilize improved processor speeds that were not available when the legacy equipment was designed. This potentially enables the binarizers inside the new image processing equipment to perform much faster, which is better, and in addition to have the advantage of working on a better input image.

It is to be understood that the above description is intended to be illustrative, and not restrictive. Many other embodiments will be apparent to those of skill in the art upon reading and understanding the above description. It should be noted that embodiments discussed in different portions of the description or referred to in different drawings can be combined to form additional embodiments of the present application. The scope of the invention should, therefore, be determined with reference to the appended claims, along with the full scope of equivalents to which such claims are entitled.

What is claimed is:

1. An apparatus for improving a scanning and sorting system that processes a plurality of postal items having printed physical address identification image data on a surface thereof, the scanning and sorting system including a legacy lower resolution camera for generating image data in legacy data formats and reduced resolutions and legacy image processing equipment for processing the legacy image data, the apparatus comprising:

a camera generating higher resolution image data than the legacy lower resolution camera, the higher resolution camera adapted to capture higher resolution images of the physical address identification image data from the surface of the postal items being scanned including the printed physical address identification data; and a scanning adaptor device interposed between the higher resolution camera and the legacy image processing equipment to provide compatibility between the higher resolution camera and the legacy image processing equipment, the scanning adaptor device including:

an input connector arranged to couple the scanning adaptor device to the higher resolution camera and to enable reception of the higher resolution image data from the higher resolution camera via a higher resolution data signal;

an image format conversion apparatus configured to convert the higher resolution image data including the physical address identification image data received via the higher resolution signal into legacy-compatible image data, the legacy compatible image data having a data format and reduced resolution that is compatible with the legacy image processing equipment and including the physical address identification image data; and a backward-compatible legacy connector arranged to couple the scanning adaptor device to the legacy image processing equipment and to enable transmission of the legacy-compatible image data from the scanning adaptor device to the legacy image processing equipment via a legacy data signal, wherein the legacy data signal is consistent with the data format and electrical signaling characteristics required by the legacy image processing equipment, and wherein the backward-compatible legacy connector is dimensionally configured to facilitate physical attachment to the legacy image processing equipment, wherein the input connector is further configured to accommodate reception of one or more control signals from the higher resolution camera in a first format compatible with the higher resolution camera, the image format conversion apparatus is further configured to convert the one or more control signals from the first format into a one or more control signals in a second format compatible with the legacy camera; and the backward-compatible legacy connector is further configured to accommodate transmission of the control signals in the second format.

2. The apparatus of claim 1, further including an image stamping apparatus configured to generate and embed in the legacy-compatible image data, an image identification stamp uniquely identifying each image and to associate it with a respective postal item being scanned and sorted.

3. The apparatus of claim 1, further including a connector configured to provide higher resolution data that is equivalent to the higher resolution image data received from the higher resolution camera.

4. The apparatus of claim 1, further including a connector configured to provide as an output from the scanning adaptor device, the higher resolution image data received from the higher resolution camera.

5. The apparatus of claim 2, further comprising:
a tag generating apparatus configured to generate a plurality of higher resolution image identification tags that associate one or more of the higher resolution image data with corresponding one or more of the legacy-compatible image data that contain the embedded reduced resolution image identification stamp; and
at least one additional connector configured to provide as an output from the scanning adaptor device, the higher resolution image data along with their higher resolution image identification tags.

6. The apparatus of claim 2, further including a mechanism for selectively disabling the generation and embedding of the reduced resolution image identification tags within the legacy-compatible image data.

7. A scanning adaptor device for improving a scanning and sorting system that processes a plurality of postal items having printed physical address image identification data on a surface thereof, the scanning and sorting system including legacy image processing equipment for processing legacy image data in data formats and reduced resolutions provided by a legacy lower resolution camera and a higher resolution camera adapted to capture images of the physical address identification image data from the surface of the postal items being scanned including the printed physical address identification data at a higher resolution than the legacy lower resolution camera, the scanning adaptor device interposed between the higher resolution camera and the legacy image processing equipment and comprises:
an input connector arranged to couple the scanning adaptor device to the higher resolution camera and to enable reception of the higher resolution image data from the higher resolution camera via a higher resolution data signal;
an image format conversion apparatus configured to convert the higher resolution image data including the physical address identification image data received via the higher resolution signal into legacy-compatible image data, the legacy compatible image data having a data format and reduced resolution that is compatible with the legacy image processing equipment and including the physical address identification image data; and
a backward-compatible legacy connector arranged to couple the scanning adaptor device to the legacy image processing equipment and to enable transmission of the legacy-compatible image data from the scanning adaptor device to the legacy image processing equipment via a legacy data signal,
wherein the legacy data signal is consistent with the data format and electrical signaling characteristics required by the legacy image processing equipment, and
wherein the backward-compatible legacy connector is dimensionally configured to facilitate physical attachment to the legacy image processing equipment,
wherein the input connector is further configured to accommodate reception of one or more control signals from the higher resolution camera in a first format compatible with the higher resolution camera;
the image format conversion apparatus is further configured to convert the one or more control signals from the first format into a one or more control signals in a second format compatible with the legacy camera; and
the backward-compatible legacy connector is further configured to accommodate transmission of the control signals in the second format.

8. The scanning adaptor device of claim 7, further including an image stamping apparatus configured to generate and embed in the legacy-compatible image data, an image identification stamp uniquely identifying each image and to associate it with a respective postal item being scanned and sorted.

9. The scanning adaptor device of claim 7, further including a connector configured to provide higher resolution data that is equivalent to the higher resolution image data received from the higher resolution camera.

10. The scanning adaptor device of claim 7, further including a connector configured to provide as an output from the scanning adaptor device, the higher resolution image data received from the higher resolution camera.

11. The scanning adaptor device of claim 8, further comprising:
a tag generating apparatus configured to generate a plurality of higher resolution image identification tags that associate one or more of the higher resolution image data with corresponding one or more of the legacy-compatible image data that contain the embedded reduced resolution image identification stamp; and
at least one additional connector configured to provide as an output from the scanning adaptor device, the higher resolution image data along with their higher resolution image identification tags.

12. The scanning adaptor device of claim 8, further including a mechanism for selectively disabling the generation and embedding of the reduced resolution image identification tags within the legacy-compatible image data.

13. A method for improving a scanning and sorting system that processes a plurality of postal items having printed physical address image identification data on a surface thereof, the scanning and sorting system including a legacy lower resolution camera for generating image data in legacy data formats and reduced resolutions and legacy image processing equipment for processing the legacy image data, the method comprising:
providing a camera generating higher resolution image data than the legacy lower resolution camera, the higher resolution camera adapted to capture higher resolution images of the physical address identification image data from the surface of the postal items being scanned including the printed physical address identification data; and
interposing a scanning adaptor device between the higher resolution camera and the legacy image processing equipment to provide compatibility between the higher resolution camera and the legacy image processing equipment, the scanning adaptor device configured for:

coupling, via an input connector, the scanning adaptor device to the higher resolution camera;

enabling, via the input connector, reception of the higher resolution image data from the higher resolution camera through a higher resolution data signal;

converting, via an image format conversion apparatus, the higher resolution image data including the physical address identification image data received through the higher resolution signal into legacy-compatible image data, the legacy compatible image data having a data format and reduced resolution that is compatible with the legacy image processing equipment and including the physical address identification image data;

coupling, via a backward-compatible legacy connector, the scanning adaptor device to the legacy image processing equipment; and enabling, via the backward-compatible legacy connector, transmission of the legacy-compatible image data from the scanning adaptor device to the legacy image processing equipment via a legacy data signal, wherein the legacy data signal is consistent with the data format and electrical signaling characteristics required by the legacy image processing equipment, and wherein the backward-compatible legacy connector is dimensionally configured to facilitate physical attachment to the legacy image processing equipment, configuring the input connector to accommodate reception of one or more control signals from the higher resolution camera in a first format compatible with the higher resolution camera, configuring the image format conversion apparatus to convert the one or more control signals from the first format into a one or more control signals in a second format compatible with the legacy camera; and configuring the backward-compatible legacy connector to accommodate transmission of the control signals in the second format.

14. The method of claim 13, further including generating and embedding in the legacy-compatible image data, via an image stamping apparatus, an image identification stamp uniquely identifying each image and to associate it with a respective postal item being scanned and sorted.

15. The method of claim 13, further including providing connector configured to provide higher resolution data that is equivalent to the higher resolution image data received from the higher resolution camera.

16. The method of claim 13, further including providing a connector configured to provide as an output from the scanning adaptor device, the higher resolution image data received from the higher resolution camera.

17. The method of claim 14, further comprising:
generating, via tag generating apparatus, a plurality of higher resolution image identification tags that associate one or more of the higher resolution image data with corresponding one or more of the legacy-compatible image data that contain the embedded reduced resolution image identification stamp; and providing at least one additional connector configured to provide as an output from the scanning adaptor device, the higher resolution image data along with their higher resolution image identification tags.

18. The method of claim 14, further including providing a mechanism for selectively disabling the generation and embedding of the reduced resolution image identification tags within the legacy-compatible image data.

19. A method for improving a scanning and sorting system that processes a plurality of postal items having printed physical address image identification data on a surface thereof, the scanning and sorting system including legacy image processing equipment for processing legacy image data in data formats and reduced resolutions provided by a legacy lower resolution camera and a higher resolution camera adapted to capture images of the physical address identification image data from the surface of the postal items being scanned including the printed physical address identification data at a higher resolution than the legacy lower resolution camera, the method comprising:

interposing a scanning adaptor device between the higher resolution camera and the legacy image processing equipment to provide compatibility between the higher resolution camera and the legacy image processing equipment, the scanning adaptor device configured for:

coupling, via an input connector, the scanning adaptor device to the higher resolution camera;

enabling, via the input connector, reception of the higher resolution image data from the higher resolution camera through a higher resolution data signal;

converting, via an image format conversion apparatus, the higher resolution image data including the physical address identification image data received through the higher resolution signal into legacy-compatible image data, the legacy compatible image data having a data format and reduced resolution that is compatible with the legacy image processing equipment and including the physical address identification image data;

coupling, via a backward-compatible legacy connector, the scanning adaptor device to the legacy image processing equipment; and enabling, via the backward-compatible legacy connector, transmission of the legacy-compatible image data from the scanning adaptor device to the legacy image processing equipment via a legacy data signal, wherein the legacy data signal is consistent with the data format and electrical signaling characteristics required by the legacy image processing equipment, and wherein the backward-compatible legacy connector is dimensionally configured to facilitate physical attachment to the legacy image processing equipment, configuring the input connector to accommodate reception of one or more control signals from the higher resolution camera in a first format compatible with the higher resolution camera, configuring the image format conversion apparatus to convert the one or more control signals from the first format into a one or more control signals in a second format compatible with the legacy camera; and configuring the backward-compatible legacy connector to accommodate transmission of the control signals in the second format.

20. The method of claim 19, further including generating and embedding in the legacy-compatible image data, via an image stamping apparatus, an image identification stamp uniquely identifying each image and to associate it with a respective postal item being scanned and sorted.

21. The method of claim 19, further including providing connector configured to provide higher resolution data that is equivalent to the higher resolution image data received from the higher resolution camera.

22. The method of claim 19, further including providing a connector configured to provide as an output from the scanning adaptor device, the higher resolution image data received from the higher resolution camera.

23. The method of claim 20, further comprising:
generating, via tag generating apparatus, a plurality of higher resolution image identification tags that associate one or more of the higher resolution image data with corresponding one or more of the legacy-compatible image data that contain the embedded reduced resolution image identification stamp; and
providing at least one additional connector configured to provide as an output from the scanning adaptor device, the higher resolution image data along with their higher resolution image identification tags.

24. The apparatus of claim 20, further including providing a mechanism for selectively disabling the generation and embedding of the reduced resolution image identification tags within the legacy-compatible image data.

\* \* \* \* \*